July 3, 1928.　　　　　　　　　　　　　　　1,675,560
P. JUBIEN
AGITATOR
Filed July 29, 1921　　　2 Sheets-Sheet 1

July 3, 1928. 1,675,560

P. JUBIEN

AGITATOR

Filed July 29, 1921  2 Sheets-Sheet 2

Patented July 3, 1928.

1,675,560

UNITED STATES PATENT OFFICE.

PAUL JUBIEN, OF CHICAGO, ILLINOIS, ASSIGNOR TO B. F. GUMP CO., OF CHICAGO, ILLINOIS, A CORPORATION OF ILLINOIS.

AGITATOR.

Application filed July 29, 1921. Serial No. 488,388.

My invention relates to devices for transforming rotary motion into reciprocating motion, and the object thereof is to provide a simple, cheap and effective mechanism by which reciprocating machines such as screens for use in the manufacture of flour and other milling operations may be vibrated in straight lines without lateral movements of the screens themselves or of the mechanism such as eccentrics which are used to produce such reciprocatory motion.

It is a further object of my invention to produce the results described without the communication of vibration to the other parts of the mechanism and to do away with the wear and deterioration of such extrinsic parts of the machine and of the building or supports upon which it is placed, as well as of the noise resulting therefrom.

Figure 1:
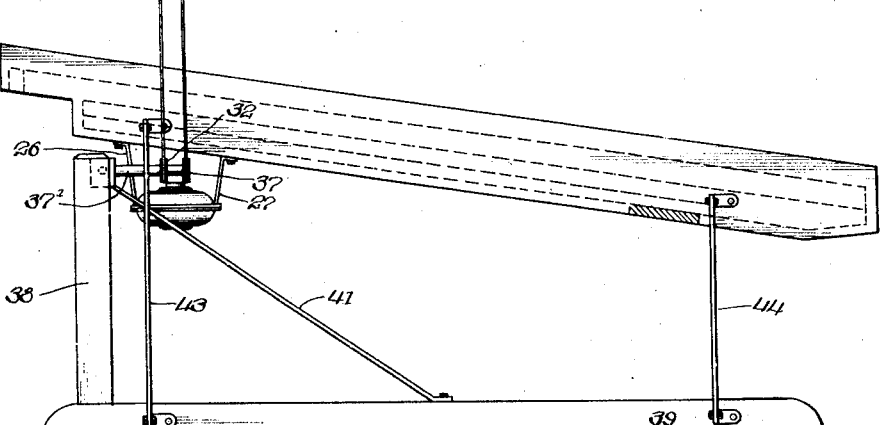
Figure 1:
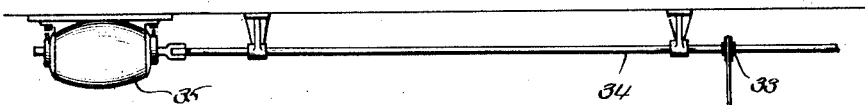
Figure 2:
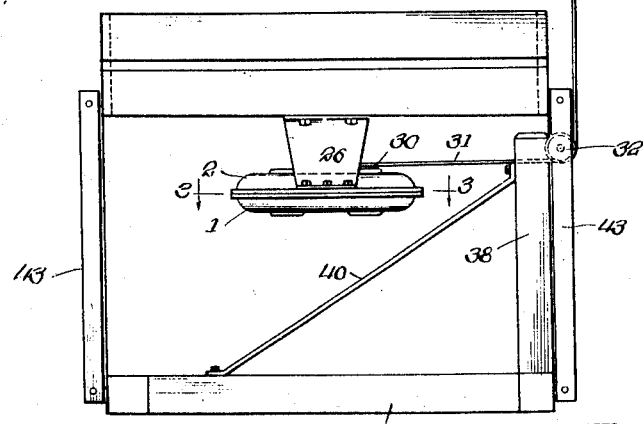
Figure 5:
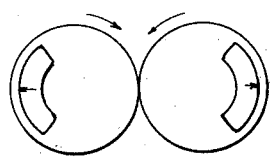
Figure 6:
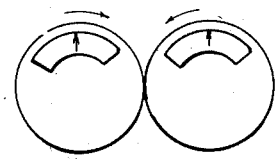
Figure 7:
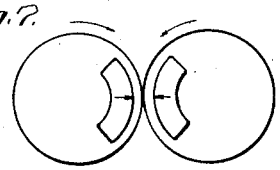
Figure 8:
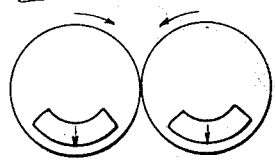
Figure 3:
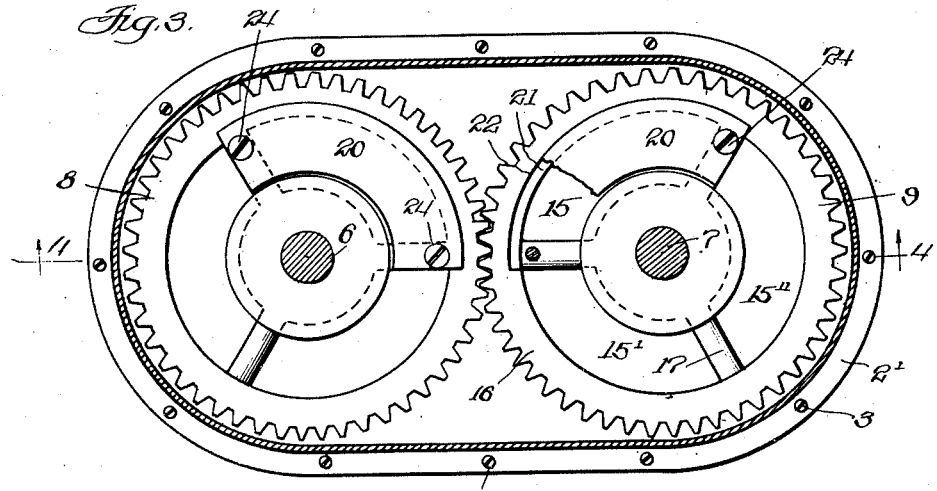
Figure 4:
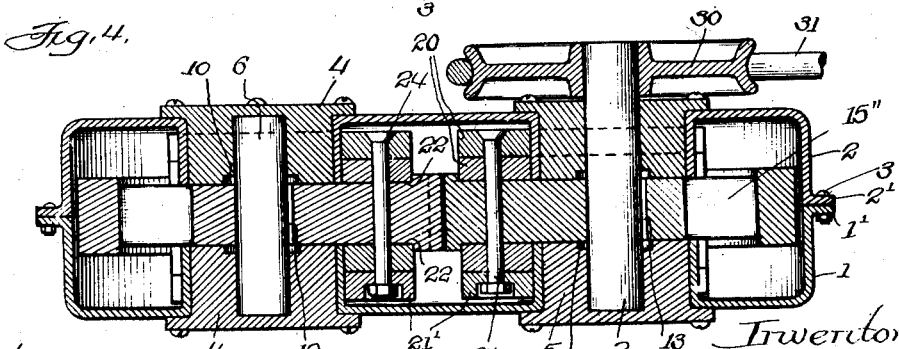

I have illustrated my improved device by reference to a shaker frame of well known character adapted to contain sieves or screens. In the drawings Fig. 1 shows a side elevation thereof, and Fig. 2 shows an end elevation of the device shown in Fig. 1, looked at from the left. Fig. 3 is a plan view of my improved device taken on the line 3—3 of Fig. 2. Fig 4 is a vertical, longitudinal section of the same taken on the line 4—4 of Fig. 3. Figs. 5 to 8 are diagrammatic views showing successive positions of the actuating wheels.

My invention comprises a casing which includes the lower section 1 and the upper section 2 attached to each other by flanges 1' and 2' connected by the bolts 3. Bearing boxes 4 and 5 are mounted in the said casing, and 6 and 7 are shafts journaled in the said boxes. While I have illustrated this portion of the device by plain bearings I prefer in practice to use anti-friction bearings. Gears 8 and 9 have hubs 10 and 11 and are secured substantially in the same plane on said shafts by keys 12 and 13. The said gears are of equal size and are provided with the same number of teeth, which centrally mesh together in the longitudinal axis of the device thereby causing them to rotate at equal speed. The said gears are overweighted to throw them out of balance. An illustration of means by which this may be done is shown in Fig. 3, special reference being had to the right hand gear therein shown. This gear is divided into sectors of substantially 120 degrees each.

The sector 15 is preferably cast solid and integral with the rim 16 of the wheel. Sectors 15' and 15" are relatively light or entirely open in which case they are separated by the spokes 17. It is evident that the force with which the unbalanced mechanism will act will depend upon the excess of weight in the weighted sector as compared with the unweighted sector or sectors. As a means of increasing the activity of the machine I may provide additional over-weights 20, the lower edges of which are adapted to be received within a groove 21 on the inner portion of the rim of the wheels and fitted against the shoulder 22 thereof. Such additional over-weights may be secured to the wheel by bolts 24 which may also be used if desired to attach other and additional over-weight material 21' on the lower sides of the gear wheels.

This device constructed as described is attached to the shaker frame by brackets 26 and 27 or other suitable means. The shaft 7 is extended to provide for attaching a grooved belt wheel 30. A band or belt 31 passes thereover and is turned about the pulleys 32 and is extended to and passes around a pulley 33 on power shaft 34 driven by motor 35 or other source of power.

The post 38 is mounted on the base framing 39 of the machine and held in position by braces 40 and 41. This merely illustrates a means by which the pulleys 37 are rigidly supported on a bracket 37'. The shaker frame is supported in an inclined position by flexible arms 43 and 44, or other suitable means adapted to permit longitudinal movement of the frame with reference to the base of the machine. While said supports are thin enough to permit longitudinal movement of the shaker frame they are relatively broad to give sufficient supporting strength. It is not necessary, however, to provide bracing to prevent lateral movement thereof resulting from the movements of my device when in action. What this action is, is readily understood from a consideration of the diagrammatic views shown in Figs. 5 to 8, inclusive. Assuming power to be applied by the belt 31 through pulley 30 to the shaft 7 the gear wheel mounted thereon is rotated, correspondingly rotating the other gear with which it is meshed in the opposite direction. It makes no difference in which direction the gears are rotated, the result is the same, but assuming that they are rotated as indicated by the arcuate arrows shown in the drawings: When in the relative positions shown in Fig. 5 the over-weighted portions of the wheels will have the centrifugal forces thereof acting in opposite direction as shown by the small arrows. A neutral point is thus established and the shaker frame assumes its normal position. Upon rotation to the points shown in Fig. 6 the centrifugal forces of the two weights will be exerted in the direction of the small arrows and will be united to move the device with the attached shaker frame in that direction. Upon being rotated to the relative positions shown in Fig. 7 the centrifugal forces will neutralize each other, a neutral point is established and the shaker frame will again reach its normal position. Upon further revolution to the points shown in Fig. 8 the centrifugal forces of the weight will be unitedly exerted in directions opposite to those in Fig. 6 and the shaker frame will be moved in the same direction to the extent of its throw. With the next quadrantal movement the neutral point will again be established at the starting point illustrated in Fig. 5. A complete cycle of action of the overweighted gears or rotors causes one complete reciprocatory movement of the device and its attached shaker frame. The movement will be in a straight line in a normal plane and without lateral movements of the shaker frame, thereby establishing an effective oscillatory or vibrating movement of that portion of the device which it is desired to move, without communication of unnecessary vibrations to supporting structures and practically without noise.

In order that the apparatus shall operate smoothly and with the greatest efficiency the wheels or rotors should be so disposed and operated with reference to each other or geared together that the radii of rotation which pass through the centrifugal centers of the over-weights, or the mass of over-weighting material, as determined when the wheels are rotated, shall be substantially in alignment when at the neutral point and shall be parallel to each other when revolved to points 90 degrees from said positions of alignment. It is not necesary that the actuating devices or rotors should consist of overweighted wheels as the actuating weights may be carried on arms rotating in circles of equal radii in the same plane. Furthermore it is not necessary that such rotors should be in immediate proximity to each other or directly geared together. They may be separated from each other and given uniform rotation in the plane thereof by means of other devices such as sprocket chains, or by means of independent driving devices such as trains of gears; and many other changes may be made which are equally within the scope of my invention.

It will be especially noted that changes in the position of my device relatively to the apparatus upon which it is used will cause the direction of reciprocatory vibration of said apparatus to be changed accordingly. And while it is the primary purpose of my invention to provide straight-line, non-lateral, reciprocating movements, changes in the relative weighting of the rotors may be made; and thereby the reciprocatory movements of the device may be given unequal force or more or less gyratory movement.

I claim:

1. In an agitator, a framing, a pair of spur gears journaled in said framing and meshing with each other so as to revolve uniformly in opposite directions with their central planes coinciding, an overweighted sector formed integrally with each of said gears whereby when said gears are revolved uniform reciprocating transverse movement is given to said framing, and means carried by the gears and balanced in respect to their central planes for increasing the force of said reciprocating movement.

2. In an agitator, a frame, a pair of spur gears journaled in said framing and meshing with each other so as to revolve uniformly in opposite directions with their central planes coinciding, an overweighted sector formed integrally with each of said gears whereby when said gears are revolved uniform reciprocating transverse movement is given to said framing, and means for removably securing additional overweights to said gears for increasing the force of said reciprocating movement.

3. In an agitator, a framing, a pair of spur gears journaled in said framing and meshing with each other so as to revolve uniformly in opposite directions with their central planes coinciding, an overweighted sector formed integrally with each of said gears and located between the side faces of the latter whereby when said gears are revolved uniform reciprocating transverse movement is given to said framing, and equal overweights removably secured to each side of said overweighted sectors for increasing the force of said reciprocating movements.

4. In an agitator, a casing, a plurality of shafts, an overweighted spur gear carried by each of said shafts, and means carried by said casing for rotatably supporting both ends of each shaft, said gears being intermeshed to revolve at uniform peripheral speed.

5. In an agitator, a casing, a plurality of shafts, an equally overweighted spur gear carried by each of said shafts, and bearings carried by said casing for rotatably supporting said shafts in juxtaposition to each side face of its respective spur gear, said gears being intermeshed to revolve at uniform speed.

6. In an agitator, a casing, a plurality of shafts, a spur gear carried by each of said shafts, an overweighted sector formed integrally with each of said gears and located between the side faces of the latter, a pair of bearings for each shaft carried by said casing with the adjacent ends of each pair of bearings substantially abutting the outer ends of its respective gear hub, said gears being intermeshed to revolve at uniform speed, and equal overweights removably secured to both side faces of each overweighted sector and positioned to travel around said bearings.

7. In an agitator, a casing, a pair of co-acting wheels of equal size journaled in said casing and geared together to rotate uniformly in opposite directions with coinciding central planes, and equal counterweights on each of said wheels exerting centrifugal pulls thereon with the centers of such pull on a common plane coinciding with the central planes of the wheels whereby when said wheels are rotated uniform reciprocating transverse movement is given to said casing, each transverse movement being in the direction of the united movement of the counter-weights.

8. In an agitator, a casing entirely closed with the exception of a shaft hole opening through one face thereof, a pair of shafts journaled in the casing with an end of one shaft protruding through said shaft hole, intermeshing gears mounted on said shafts to rotate with coinciding central planes, and overweights carried by said gears and arranged to overbalance the latter in respect to their axes and balance them in respect to their central planes.

9. In an agitator, a framing including a casing adapted for receiving lubricant by being entirely closed with the exception of a shaft hole opening through one face thereof, a pair of shafts journaled in the casing with an end of one shaft protruding through said shaft hole, a rotor mounted on each shaft so as to rotate with coinciding central planes, weighted sectors formed in said rotors, additional overweights detachably fastened to each sector, said sectors and overweights being arranged to overbalance the rotors in respect to their axes and balance them in respect to their central planes, and means for causing said rotors to revolve at uniform speed.

In witness whereof I have hereunto set my hand at Chicago, Cook County of Illinois, this 15th day of July, 1921.

PAUL JUBIEN.